(12) United States Patent
Hishida

(10) Patent No.: US 7,827,771 B2
(45) Date of Patent: Nov. 9, 2010

(54) MOWER WITH DISC-SHAPED MOWING BLADE

(75) Inventor: Tadashi Hishida, Sakai (JP)

(73) Assignee: VIV Engineering Inc., Sakai-shi (JP)

( * ) Notice: Subject to any disclaimer, the term of this patent is extended or adjusted under 35 U.S.C. 154(b) by 0 days.

(21) Appl. No.: 12/585,060

(22) Filed: Sep. 2, 2009

(65) Prior Publication Data

US 2009/0320429 A1    Dec. 31, 2009

Related U.S. Application Data

(62) Division of application No. 11/501,690, filed on Aug. 10, 2006, now Pat. No. 7,624,559.

(30) Foreign Application Priority Data

Jan. 10, 2006    (JP) .............................. 2006-002758

(51) Int. Cl.
*A01D 34/00* (2006.01)
(52) U.S. Cl. ......................................... 56/12.7; 30/276
(58) Field of Classification Search ................... 56/12.7; 30/276, 346, 347, 329, 342
See application file for complete search history.

(56) References Cited

U.S. PATENT DOCUMENTS

| 2,669,826 | A | * | 2/1954 | Watrous ...................... 56/13.4 |
| 2,708,820 | A | | 5/1955 | Britten, III .................... 56/25.4 |
| 3,415,043 | A | | 12/1968 | Shones ......................... 56/25.4 |
| 4,104,797 | A | | 8/1978 | Ballas .......................... 30/276 |
| 4,134,204 | A | | 1/1979 | Perdue ......................... 30/276 |
| 4,211,005 | A | | 7/1980 | Woods ......................... 30/276 |
| 4,268,964 | A | | 5/1981 | Moore .......................... 30/276 |
| 4,316,355 | A | * | 2/1982 | Hoff ............................ 56/11.3 |
| 4,490,910 | A | | 1/1985 | Mattson et al. ............... 30/276 |
| 4,497,161 | A | * | 2/1985 | Vissers et al. ................ 56/13.6 |
| 4,566,189 | A | | 1/1986 | Muto ........................... 30/276 |
| 4,835,867 | A | | 6/1989 | Collins et al. ................. 30/276 |
| 4,882,843 | A | | 11/1989 | Baba ............................ 30/276 |
| 5,103,561 | A | | 4/1992 | Harada et al. ................. 30/276 |
| 5,212,936 | A | * | 5/1993 | Lauritsen ......................... 56/6 |
| 5,313,770 | A | | 5/1994 | Smothers ..................... 56/12.7 |
| 5,461,787 | A | | 10/1995 | Araki et al. ................... 30/276 |
| 5,906,051 | A | | 5/1999 | Nannen ........................ 30/276 |
| 6,032,369 | A | * | 3/2000 | Tada et al. .................... 30/276 |
| 6,052,907 | A | | 4/2000 | Wang ........................... 30/276 |
| 6,065,214 | A | * | 5/2000 | Nagashima ................... 30/276 |
| 6,279,235 | B1 | | 8/2001 | White et al. .................. 30/276 |

(Continued)

FOREIGN PATENT DOCUMENTS

JP    11-009051    1/1999

*Primary Examiner*—Árpád Fábián-Kovács
(74) *Attorney, Agent, or Firm*—Kratz, Quintos & Hanson, LLP

(57) ABSTRACT

A mower carried on shoulders or back to be used. A bowl-shaped contact member is disposed under a rotating body driven to rotate around a vertical axis as to be freely rotate around the axis. And, a bottom wall face portion of the bowl-shaped contact member has a flat face at right angles with the axis on a lower face. And, the bowl-shaped contact member has a curved face portion connecting a cylindrical peripheral wall face portion, of which center is the axis, and the bottom wall face portion.

2 Claims, 4 Drawing Sheets

U.S. PATENT DOCUMENTS

| | | | |
|---|---|---|---|
| 6,446,345 B1 | 9/2002 | Tsunoda et al. | 30/276 |
| 6,666,009 B1 * | 12/2003 | Brandon | 56/12.7 |
| 6,675,563 B1 * | 1/2004 | Ehrhart et al. | 56/10.3 |
| 6,718,745 B1 * | 4/2004 | Adams | 56/6 |
| 6,854,185 B1 | 2/2005 | Alliss | 30/276 |
| 6,971,223 B2 | 12/2005 | Scott et al. | 56/12.7 |
| 7,059,106 B2 * | 6/2006 | Brandon | 56/12.7 |
| 7,302,790 B2 * | 12/2007 | Brandon | 56/12.7 |

* cited by examiner

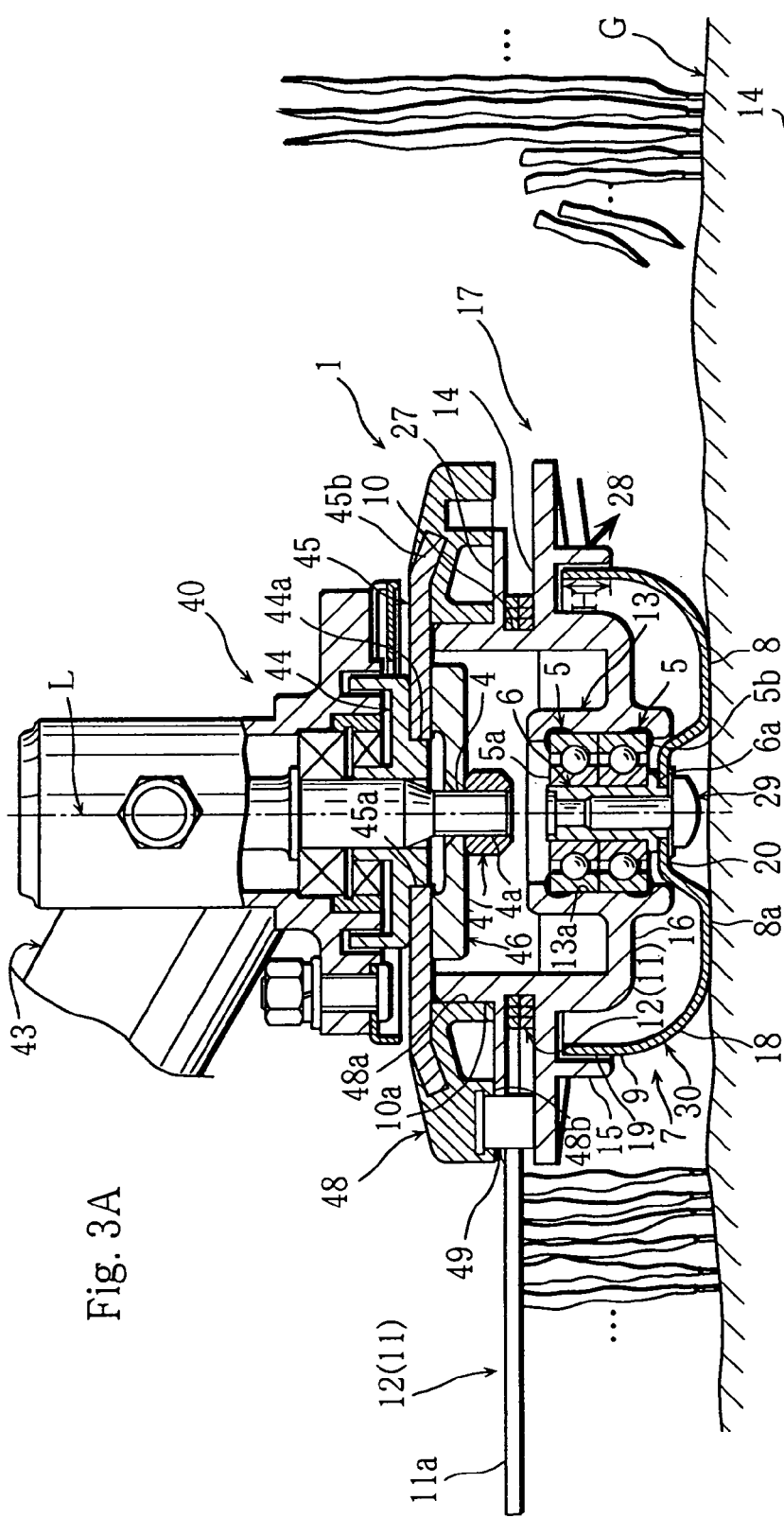
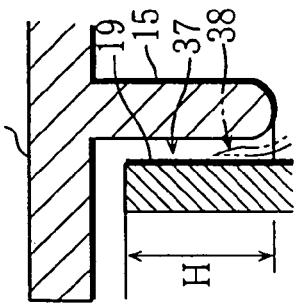
Fig. 3A
Fig. 3B

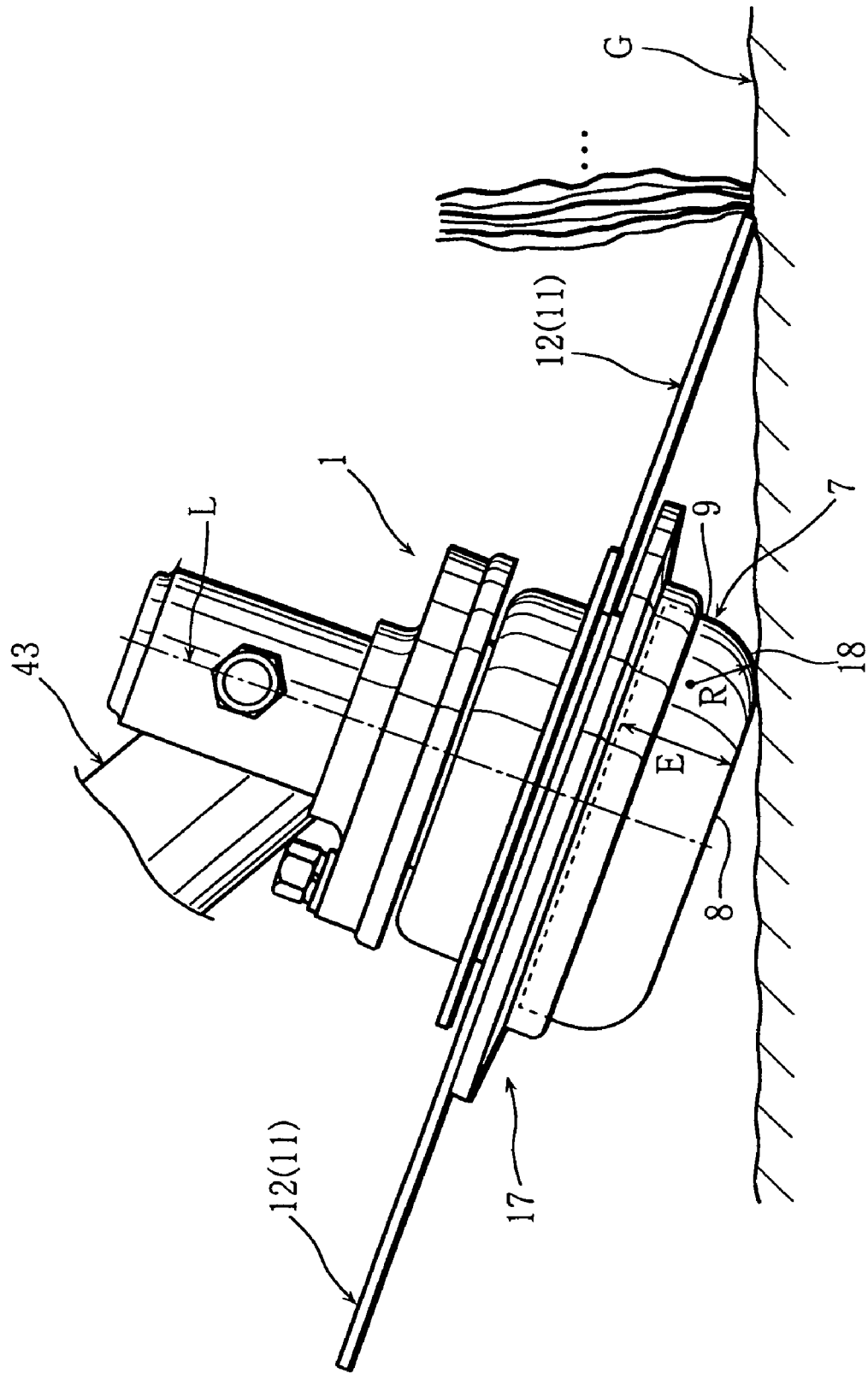

MOWER WITH DISC-SHAPED MOWING BLADE

RELATED APPLICATIONS

This application is a division of U.S. application Ser. No. 11/501,690, filed Aug. 10, 2006 now U.S. Pat. No. 7,624,559, which application claims priority of Japanese Application No. 2006-2758, filed Jan. 10, 2006, the entire contents of which are incorporated herein by reference.

BACKGROUND OF THE INVENTION

1. Field of the Invention

This invention relates to a mower for mowing grass and the like in gardens.

2. Description of the Related Art

Conventionally, a mower, carried on the back, provided with a disc-shaped mowing blade rotating around an approximately vertical axis on an end of an operation rod, and mowing the grass with a uniform desired length by holding the operation rod to change the height of the mowing blade from the ground, is known (refer to the Japanese Patent Provisional Publication No. H11-9051, for example).

However, high skill is required to conduct mowing work with keeping the height and moving the mower because the operation rod and the mowing blade are heavy, and the mowing blade is in high-speed rotation and the operation rod is moved by vibration. For a person who is not accustomed to using the mower, it is difficult to keep the height of the mowing blade from the ground in operation, and weed and the like in fields and gardens can not be the desired length. And, the mowing blade may unintentionally contact the ground and cause danger by jumping up. And, the mowing blade may crawl on the ground when touching the ground, and hinder smooth mowing work.

It is therefore an object of the present invention to provide a mower with which the weed and the like in fields and gardens can be mowed beautifully with a uniform desired length by a person who is not skilled in mowing work with safety.

BRIEF DESCRIPTION OF THE DRAWINGS

The present invention will be described with reference to the accompanying drawings in which:

FIG. 3A is a cross-sectional side view of a principal portion;

FIG. 3B is a cross-sectional side view with a partial enlargement;

FIG. 4 is a side view showing an operational state in inclination; and

PREFERRED EMBODIMENTS OF THE INVENTION

Figure 1:
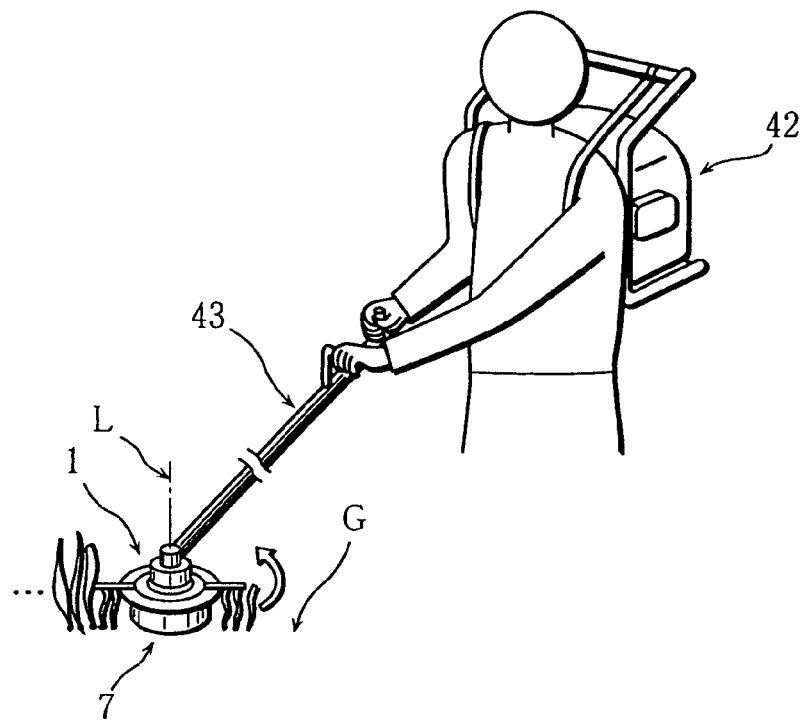
FIG. 1 is an explanatory perspective view of operation state showing an embodiment of the mower relating to the present invention.
Figure 2:
FIG. 2 is an explanatory perspective view of operation state.

Preferred embodiments of the present invention will now be described with reference to the accompanying drawings.

FIGS. 1 through 4 show an embodiment of a mower relating to the present invention. This mower is used with a motor 42 carried on the back (refer to FIG. 1) or an operation rod 43 connected to the motor 42 is suspended from the shoulder by a shoulder strap (refer to FIG. 2), and provided with a rotation transmitting member 40, having a rotation driving shaft 4 to which rotation driving force of the motor 42 is transmitted, rotated around an approximately vertical axis L, on an end of the operation rod 43. And, a rotating body 1 with mowing blade is attached to the rotation transmitting member 40 and freely rotated by the rotation force of the rotation driving shaft 4. And, a bowl-shaped contact member 7, which contacts ground G to keep the height of the rotating body 1 constant, is disposed on a lower side of the rotating body 1 as to freely idle (against the rotating body 1) around the axis L.

The rotation transmitting member 40 is provided with an attachment disc 44 having a downward fit short cylinder portion 44a on a lower portion, and the rotation driving shaft 4 is inserted to a center hole of the fit short cylinder portion 44a and fixed to protrude downward. A male screw 4a is formed on a part protruding downward from the attachment disc 44.

Next, the rotating body 1 is described. The rotating body 1 is provided with a fixation disc 45 having a central hole portion 45a mounted on the fit short cylinder portion 44a of the attachment disc 44 and a peripheral edge 45b composed of hard material slightly bent downward, a connection disc 48 of approximately short cylinder fit to the peripheral edge 45b of the fixation disc 45 and having a large diameter hole portion 48a formed with female screw, and plural cord-hitching posts 49 fixed to a lower face 48b of the connection disc 48 and touching a (later-described) lower outer brim portion 14 of a rotating disc member 17. The lower face 48b of the connection disc 48 contacts an upper face of an upper outer brim portion 2T (described later) of the rotating disc member 17, and a male screw 10a of the rotating disc member 17 is screwed to the female screw of the large diameter hole portion 48a. And, later-described resin cord 11 receiving centrifugal force by the rotation hitches to the cord-hitching post 49. And, the peripheral edge 45b of the fixation disc 45 is fixed as to be embedded in an upper edge portion of the large diameter hole portion 48a.

Further, the rotating body 1 is provided with the rotating disc member 17 attached to the connection disc 48, and the resin cord 11 spooled by the rotating disc member 17 and of which end side 11a serves as a mowing blade 12.

Concretely, the rotating disc member 17 has a cylindrical drum portion 10 opening upward, a small cylinder portion 13 for receiving bearing disposed on a lower side within the cylindrical drum portion 10, an inner brim portion 16 connecting a lower end edge of the cylindrical drum portion 10 and a peripheral face of the small cylinder portion 13 as to be united, the upper outer brim portion 27 and the lower outer brim portion 14 parting from each other and unitedly attached to the peripheral face of the cylindrical drum portion 10, and a ring downward wall 15 of short cylinder, of which central axis is the axis L, unitedly attached to the lower face of the lower outer brim portion 14. The outside dimension of the upper outer brim portion 27 is formed smaller than that of the lower outer brim portion 14.

The fixation disc 45, the connection disc 48, the cylindrical drum portion 10, and the small cylinder portion 13 are formed as to have the axis L as the central axis.

Next, attachment process of the rotating body 1 to the rotation transmitting member 40 is described. First, the hole portion 45a of the fixation disc 45 is mounted to the fit short cylinder portion 44a of the attachment disc 44. Then, a disclike pinching member 46 having a central hole is mounted to the rotation driving shaft 4 and a nut 47 is screwed to the male screw 4a of the rotation driving shaft 4 and fastened to firmly hold the fixation disc 45 by the pinching member 46 and the attachment disc 44. The fixation disc 45 rotates unitedly with the rotation driving shaft 4 thereby.

Then, the male screw 10a of the cylindrical drum portion 10 of the rotating disc member 17 is screwed to the female screw of the large diameter hole portion 48a of the connection disc 48 to make the upper edge of the cylindrical drum portion 10 contact the lower face of the fixation disc 45. And, each of the cord-hitching post 49 is disposed as the peripheral face of the post 49 contacts the peripheral edge of the upper outer brim portion 27 and the lower portion of the post 49 contacts the upper face of the lower outer brim portion 14. The mower is set through the process described above. With this construction, the axis of the rotating disc member 17 is held to be certainly correspond to the axis L of the rotation driving shaft 4, and the axes are prevented from swaying each other. When the rotation driving shaft 4 rotates in leftward direction in top view, the male screw 10a is threaded leftward.

The lower outer brim portion 14 is disposed near and above an upper edge portion 19 of a peripheral wall face portion 9 (described later) of the bowl-shaped contact member 7, and the ring downward wall 15 surrounds the upper edge portion 19 of the peripheral wall face portion 9 (on a position distant from the upper end edge for a predetermined dimension H) to prevent mowing waste 38 such as weed from being entangled. And, a bearing 5 is inserted and fixed to the small cylinder portion 13. The upper and lower end edges of the small cylinder portion 13 are slightly bent inward to certainly keep vertical position of the bearing 5. In the present invention, one pair of ball bearings 5, of which center is the axis L, are disposed as to be vertically layered. The bearing may be a thrust bearing to which the bowl-shaped contact member 7 is connected.

The predetermined dimension H is preferably set to be more than 15% of height dimension E of the bowl-shaped contact member 7 as the mowing waste 38, getting into a gap portion 37 between the ring downward wall 15 and the upper edge portion 19 of the bowl-shaped contact member 7, falls without reaching for the upper end of the upper edge portion 19 (refer to FIG. 3B).

Each of two resin cords 11 is respectively disposed on upper and lower sides between the upper and lower outer brim portions 27 and 14 of the rotating disc member 17, each of ends is respectively fixed to the cylindrical drum portion 10 on upper and lower sides and spooled by the cylindrical drum portion 10. And, each of the end sides 11a of the cords 11 is extended outward by centrifugal force of the rotation of the rotating disc member 17 and hitched on the cord-hitching post 49 to form the mowing blade 12.

Next, the bowl-shaped contact member 7 has an attachment shaft portion 6 inside on a central portion, and the bowl-shaped contact member 7 is attached to the rotating disc member 17 as to idle by attachment of the attachment of the shaft portion 6 to the rotating disc member 17 with insertion through the bearing 5.

Concretely, the bowl-shaped contact member 7 is composed of a bowl-shaped member main body 30, the attachment shaft portion 6 vertically attached to a central portion inside the main body 30, and a bolt member 29 to fix the attachment shaft portion 6. A bottom wall face portion 8 has a flat face 8a on a lower face at right angles with the axis L. And, a head-storing portion 20 is formed by making concave (making convex upward) the lower face on the central portion of the bottom wall face portion 8, and a hole is formed on the center of the head-storing portion 20. And, attachment shaft portion 6 is formed to be cylindrical, having an outer brim portion 6a on a peripheral face on a lower end side, and a female screw is formed on an inner peripheral face of the shaft portion 6. The attachment shaft portion 6 is inserted to the central hole of the bottom wall face portion 8 of the bowl-shaped member main body 30 from the upper side to hitch the outer brim portion 6a, then, the bolt member 29 is inserted to the hole portion of the head-storing portion 20 of the bowl-shaped member main body 30 and fixed by screwing to the female screw of the attachment shaft portion 6 to form the bowl-shaped contact member 7. And, the attachment shaft portion 6 is inserted to the one pair of the bearings 5 from the lower side and fixed to the inner rings 5a. In this case, the head of the bolt member 29, stored in the head-storing portion 20, does not protrude from the flat face 8a of the bottom wall face portion 8 and does not contact the ground G.

And, the bowl-shaped member main body 30 has a curved face portion 18, unitedly formed with the main body 30, for connecting the cylindrical peripheral wall face portion 9, of which central axis is the axis L, and the bottom wall face portion 8. When the height dimension of the bowl-shaped member main body 30 is E and radius of curvature of the curved face portion 18 in cross section is R, it is preferable to set $0.25 \times E \leq R \leq 0.9 \times E$ (refer to FIG. 4). If R is less than $0.25 \times E$, when the bowl-shaped contact member 7 is inclined, it is difficult to keep the inclination because contact area of the curved face portion 18 and the ground G is small. On the other hand, when R is more than $0.9 \times E$, area of the flat face 8a of (the lower face of) the bottom wall face portion 8 is excessively small, balance of the mower in normal horizontal operation state becomes worse for the small contact area with the ground G.

Figure 5:
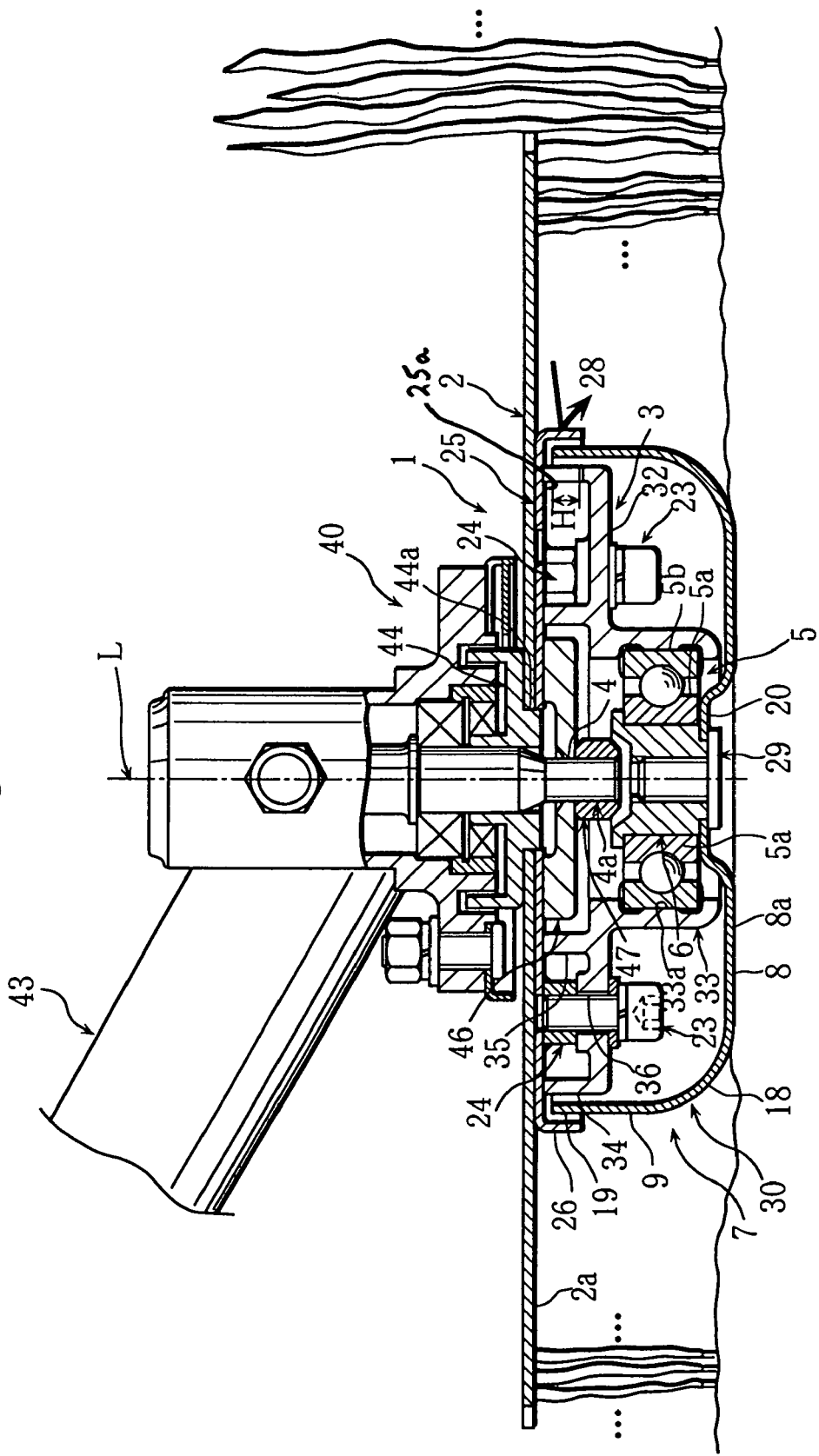
FIG. 5 is a cross-sectional side view of a principal portion showing another embodiment of the mower relating to the present invention.

Next, FIG. 5 shows another embodiment of the mower relating to the present invention. In this mower, the rotating body 1 is provided with a disc-shaped mowing blade 2, an attachment plate 25 fixed to a lower face 2a of the mowing blade 2, and a bearing-holding member 3 fixed to a lower face side 25a of the attachment plate 25. And, the attachment plate 25 is provided with a ring downward wall 26, to prevent grass from being entangled, surrounding the upper edge portion 19 of the peripheral wall face portion 9 of the bowl-shaped contact member 7. That is to say, the mower in FIG. 5 is, instead of the rotating disc member 17, the resin cord 11, the fixation disc 45, and the connection disc 48 of the mower in FIGS. 1 through 4, provided with the disc-shaped mowing blade 2, the attachment plate 25, and the bearing-holding member 3, and the rotating body 1 can be attached to the rotation transmitting member 40 of the same kind of FIGS. 1 through 4.

Concretely, the attachment plate 25 is formed as a thin circle having a hole portion fit to the short cylinder portion 44a of the attachment disc 44, and having the ring downward wall 26 formed by bending the peripheral edge of the attachment plate 25. And, plural nut members 24, for attachment of the bearing-holding member 3 with bolt-nut fastening, are fixed to the lower face of the attachment plate 25.

Then, the disc-shaped mowing blade 2 and the attachment plate 25 are serially fit to the short cylinder portion 44a of the attachment disc 44 of the rotation transmitting member 40 from the lower side, and the pinching member 46 (of the same kind of FIG. 3A) is mounted on the male screw 4a of the rotation driving shaft 4 and fastened with screwing the nut member 47 to set the mower.

Next, the bearing-holding member 3 has a bearing-holding cylinder portion 33 opening downward and an outer brim portion 32 unitedly formed with an upper end edge of the cylinder portion 33, and large and small interval-keeping portions 34 and 35, touching the lower face of the attachment plate 25 to form a gap against the rotation driving shaft 4, are protruding from an upper face of the outer brim portion 32 as to have the axis L as a central axis. And, outer brim portion 32 has female screw holes 36 on positions corresponding to the nut members 24, bolt members 23 are screwed to the female screw holes 36 and the nut members 24 and fastened to attach the bearing-holding member 3 to the attachment plate 25 in a state that the interval-keeping portions 34 and 35 of the bearing-holding member 3 are touching the lower face of the attachment plate 25.

And, the bearing 5 is fixed within an inner peripheral face 33a of the cylinder portion 33. And, upper and lower end edges of the inner peripheral face 33a of the cylinder portion 33 are slightly bent inward to certainly keep the vertical position. Although one radial ball bearing is fixed in FIG. 5, two or more bearings 5 may be layered as in FIG. 3.

The construction of the bowl-shaped contact member 7 is similar to that described with FIGS. 1 through 4, the attachment shaft portion 6 is inserted and fixed to the bearing 5. In FIG. 5, a lower peripheral face of the attachment shaft portion 6 diminishes in diameter with staged portions, an insertion portion is formed on the end, and the insertion portion is inserted to the central hole portion of the bowl-shaped member main body 30. And, the head of the attachment shaft portion 6 is formed into an outer brim to hitch to an upper edge of the inner ring 5a of the bearing 5. That is to say, the inner ring 5a is held by the outer brim head of the attachment shaft portion 6 and the upper face of the bottom wall face portion 8 of the bowl-shaped member main body 30.

And, gaps are formed between, the attachment shaft portion 6, and, the pinching member 46, rotation driving shaft 4, and the nut member 47 by the interval-keeping portions 34 and 35 of the bearing-holding member 3 to keep non-contact state, and the rotation driving force of the rotation driving shaft 4 is not transmitted to the attachment shaft portion 6, namely, the bowl-shaped contact member 7.

In the mower of FIGS. 1 through 4, when the bowl-shaped member main body 30, the rotating disc member 17 (the bearing-holding member 3 in the mower of FIG. 5), and the rotation transmitting member 40 are formed with plastic, a forth end side of the mower is made light-weight, and the mower is made easy to handle during mowing work thereby.

Next, operation method and working of the mower of the present invention will be described.

As shown in FIGS. 1 through 3A, the bowl-shaped contact member 7 is made contact the ground G while the mower of the present invention is used. The driving force of the motor 42 is transmitted to the rotation driving shaft 4 through the operation rod 43, the rotating body 1 with the mowing blade 12 is rotated, the two resin cords 11 are extended outward by the centrifugal force to serve as the mowing blades 12 to mow the grass. In this case, the flat face 8a of the bottom wall face portion 8 of the bowl-shaped contact member 7 moves while being made contact with the ground G, and the mowing blades 12 are kept at an approximately regular height and approximately horizontal to the ground G. Therefore, a person not skilled in mowing can mow the grass with a uniform length as to form a beautiful flat face. And, the mowing blade does not unintentionally contact the ground G, and danger of jumping up is avoided.

And, the bowl-shaped contact member 7, receiving weight of the rotating body 1 and the rotation transmitting member 40 through the bearing 5, idles by the bearing 5 against the rotating body 1. In other words, the bowl-shaped contact member 7 contacts the ground G in non-rotation state during the mowing work, easy work is possible while weight of the forth end side of the mower is supported on the ground, and the mowing work is possible even with one hand. The rotating body 1 does not need to be extremely light as in conventional mowers and sufficient strength can be given to the rotating body 1. And, the mowing waste 38 such as weed and cord (bine) body is not dispersed around because bowl-shaped contact member 7 does not rotate. And, fuel consumption is reduced and the rotating body 1 has good rotation efficiency because frictional force received by the bowl-shaped contact member 7 from the ground G is not transmitted to the rotating body 1.

And, the mowing waste such as mowed grass, surrounded by the ring downward wall 15 as shown with an arrow 28, is prevented from being entangled between the bowl-shaped contact member 7 and the rotating disc member 17. And, as shown in FIG. 3B, the ring downward wall 15 surrounds the upper edge portion 19 of the bowl-shaped contact member 7 for the predetermined dimension H (equal to or more than 5 mm, for example), and the mowing waste 38 falls before reaching for the upper edge portion 19.

And, as shown in FIG. 4, the rotating axis L of the rotating body 1 can be inclined by handling the operation rod 43. Therefore, lawn is mowed as to be flat face on the ground level or under the surface of the ground, and roots of weeds under the surface can be mowed. The axis L of the bowl-shaped contact member 7 is smoothly changed from vertical to inclined state with the curved face portion 18.

Also in the mower shown in FIG. 5, similar to the mower shown in FIGS. 1 through 4, mowing work is conducted with the bowl-shaped contact member 7 placed on the ground G. The mower of FIG. 5 is similar to that of FIGS. 1 through 4 in that the bowl-shaped contact member 7 idles against the rotating body 1, mowing can be conducted with the peripheral edge of the disc-shaped mowing blade 2 made close to the ground G with inclination of the axis L, and entanglement of the mowing waste 38 is prevented by the ring downward wall 26.

In the mowers of FIGS. 3A and 5, a set of bowl-shaped contact members 7, in which the height dimension E varies, may be prepared, and grass is mowed with a desired length by selection of the bowl-shaped contact member 7 attached to the rotating body 1 (not shown in Figures).

As described above, in the mower of the present invention carried on shoulder or back in operation, the bowl-shaped contact member 7 contacts the ground G and the mowing blade of the rotating member is kept at a constant height because the bowl-shaped contact member 7 disposed on the lower side of the rotating body 1 as to idle around the axis L against the rotating body 1 with the mowing blade driven to rotate around the axis L. Therefore, a worker not skilled in mowing can mow the grass with regular length and form beautiful flat face.

And, the bowl-shaped contact member 7, idling against the rotating body 1, contacts the ground G in non-rotation state during the mowing work, the rotating body 1 is prevented from jumping up by unintentional contact with the ground, and the mowing work becomes easy while the weight of the forth end side of the mower is supported by the ground, and mowing work with even one hand may be possible. And, it is not necessary to make the rotating body 1 extremely light as in conventional mowers, and sufficient strength is given to the mower. And, the fuel is not wasted, rotation efficiency of the rotating body 1 is good, and the mowing work is conducted very efficiently because the friction resistance from the ground G is not transmitted to the rotating body 1.

And, the mowing blade can be moved with keeping the blade horizontal to the ground G and at a constant height, and the grass is mowed with a constant length as to trace the ground G because the bottom wall face portion 8 of the bowl-shaped contact member 7 has the flat face 8a at right angles with the axis L.

And, the mowing blade can be moved with keeping the blade horizontal to the ground G and at a constant height, and the grass is mowed with a constant length as to trace the ground G because the bottom wall face portion 8 of the bowl-shaped contact member 7 has the flat face 8a at right angles with the axis L, and the bowl-shaped contact member 7 has the curved face portion 18 connecting the cylindrical peripheral wall face portion 9 and the bottom wall face portion 8.

And, the mowing blade can mow the lawn to form a flat face on the ground level or slightly under the ground level to mow the roots of weeds on the ground because the rotating body 1 can be smoothly inclined and kept in the inclination state by the curved face portion 18.

And, the rotating body 1 can be kept inclined stably because when the height dimension of the bowl-shaped contact member 7 is E, radius of curvature of the curved face portion 18 in cross section is R, they are set to be $0.25 \times E \leq R \leq 0.9 \times E$. Further, the rotating body 1 can be placed on the ground in good balance when used in normal horizontal state because the area of the flat face 8a of the bottom wall face portion 8 does not become excessively small.

And, the mowing waste 38 such as weed and cord (bine) body is stopped by the ring downward wall 15 and prevented from being entangled between the bowl-shaped contact member 7 and the rotating disc member 17, and the mowing work can be smoothly conducted because the rotating body 1 is provided with the rotating disc member 17 and the resin cord 11, spooled by the rotating disc member 17, of which one end side 11a serves as the mowing blade 12, and, the rotating disc member 17 has the outer brim portion 14 disposed near the upper side of the upper edge portion 19 of the peripheral wall face portion 9 of the bowl-shaped contact member 7, and the ring downward wall 15 for prevention of weed entanglement disposed on the outer brim portion 14 and surrounding the upper edge portion 19 of the peripheral wall face portion 9.

And, the bowl-shaped contact member 7 certainly idles against the rotating disc member 17 with a simple construction, and the rotation efficiency of the rotating body 1 can be made excellent because the bowl-shaped contact member 7 has the attachment shaft portion 6 on the inside center, the attachment shaft portion 6 is attached as to be inserted to the rotating disc member 17 through the bearing 5 to attach the bowl-shaped contact member 7 to the rotating disc member 17 as to freely idle.

And, the mowing waste 38 such as weed and cord (bine) body is stopped by the ring downward wall 26 and prevented from being entangled between the bowl-shaped contact member 7 and the bearing-holding member 3, and the mowing work can be smoothly conducted because the rotating body 1 is provided with the disc-shaped mowing blade 2, the attachment plate 25 fixed to the lower face 2a of the mowing blade 2, and the bearing-holding member 3 fixed to the lower face side of the attachment plate 25, and, the attachment plate 25 is provided with the ring downward wall 26 to prevent entanglement of grass surrounding the upper edge portion 19 of the peripheral wall face portion 9 of the bowl-shaped contact member 7.

And, the bowl-shaped contact member 7 certainly idles against the bearing-holding member 3 with a simple construction, and the rotation efficiency of the rotating body 1 can be made excellent because the bowl-shaped contact member 7 has the attachment shaft portion 6 on the inside center, the attachment shaft portion 6 is attached as to be inserted to the bearing-holding member 3 through the bearing 5 to attach the bowl-shaped contact member 7 to the bearing-holding member 3 as to freely idle.

While preferred embodiments of the present invention have been described in this specification, it is to be understood that the invention is illustrative and not restrictive, because various changes are possible within the spirit and indispensable features.

What is claimed is:

1. A mower carried on shoulder or back, comprising a bowl-shaped contact member disposed on a lower side of a rotating body as to idle around an axis against the rotating body with a mowing blade driven to rotate around the axis, wherein the rotating body is provided with a disc-shaped mowing blade, an attachment plate fixed to a lower face of the mowing blade, and a bearing-holding member fixed to a lower face side of the attachment plate, by bolt-nut fastening, and, the attachment plate is provided with a ring downward wall, at an outermost portion, formed by bending a peripheral edge of the attachment plate into a cylindrical configuration, to prevent entanglement of grass surrounding an upper edge portion of a peripheral wall face portion of the bowl-shaped contact member.

2. The mower as set forth in claim 1, wherein the bowl-shaped contact member has an attachment shaft portion on an inside center, the attachment shaft portion is attached as to be inserted to the bearing-holding member through a bearing to attach the bowl-shaped contact member to the bearing-holding member as to freely idle.

\* \* \* \* \*